United States Patent [19]

Millheiser

[11] 4,343,581

[45] Aug. 10, 1982

[54] DOUBLE-BEVEL SPRING RETAINING RING

[75] Inventor: Melvin Millheiser, North Bellmore, N.Y.

[73] Assignee: Waldes Kohinoor, Inc., Long Island City, N.Y.

[21] Appl. No.: 40,748

[22] Filed: May 21, 1979

[51] Int. Cl.³ ............................................. F16B 21/18
[52] U.S. Cl. ..................................... 411/517; 411/353
[58] Field of Search ...................... 85/8.8, 8.6, 8.9, 36; 403/375; 411/517, 518, 516, 353

[56] References Cited

U.S. PATENT DOCUMENTS

| | | | |
|---|---|---|---|
| 1,767,217 | 6/1930 | Kraft | 85/8.8 X |
| 2,509,081 | 5/1950 | Bluth et al. | 85/8.8 X |
| 2,595,787 | 5/1952 | Heimann | 85/8.8 X |

FOREIGN PATENT DOCUMENTS 1441467  6/1976  United Kingdom .................. 85/8.8

*Primary Examiner*—Ramon S. Britts
*Attorney, Agent, or Firm*—Burns, Doane, Swecker & Mathis

[57] ABSTRACT

A spring retaining ring of the type adapted for assembly within a groove provided therefor in a housing bore or on a shaft to form an artificial shoulder for axially locating a machine part in the bore or on the shaft. The spring comprises an open-ended ring body of spring material. The body includes opposite side surfaces, each surface including a generally radial shoulder-forming portion and a groove-seating portion which is inclined at an acute angle relative to the shoulder forming portion. Either of the groove-seating surface portions are adapted to engage a correspondingly inclined wall of the groove to take-up axial play of the machine part. The length of each groove seating surface portion is from 80% to 120% of the minimum groove penetration depth for the ring.

6 Claims, 14 Drawing Figures

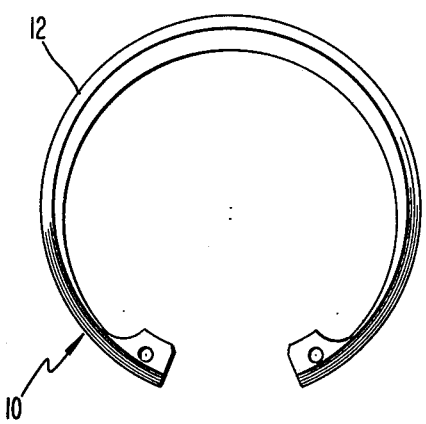
Fig. 1 PRIOR ART
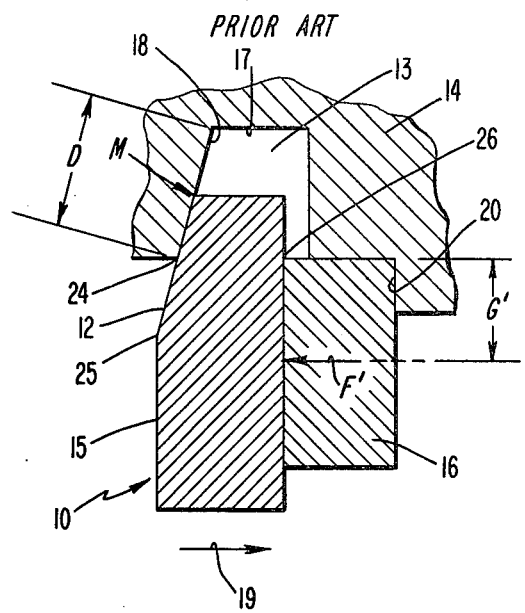
Fig. 2 PRIOR ART
Fig. 3 PRIOR ART
Fig. 4 PRIOR ART

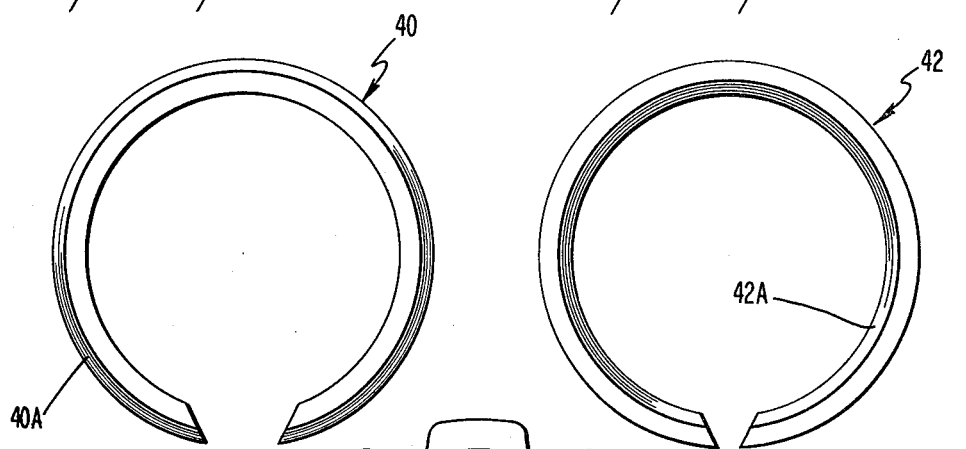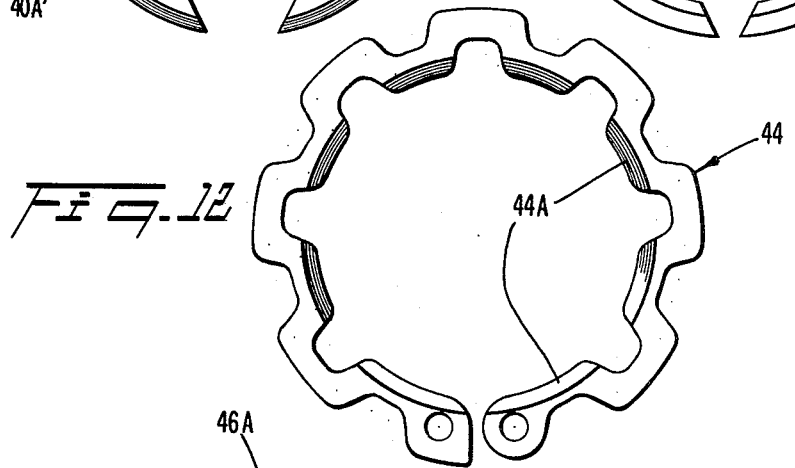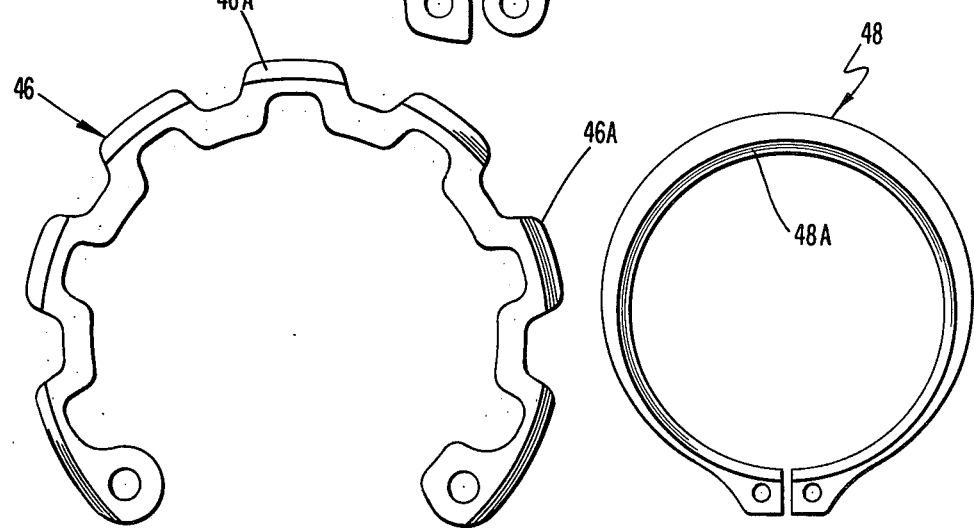

DOUBLE-BEVEL SPRING RETAINING RING

BACKGROUND AND OBJECTS OF THE INVENTION

The present invention relates to spring retaining rings of the type adapted to form an artificial shoulder for axially locating a machine part.

Split retaining rings are employed in assemblies, such as machines for example, to retain various components such as pulleys, sleeves, bearings, etc., against axial displacement. Examples of such rings may be found in U.S. Pat. No. 2,509,081 issued to Bluth on May 23, 1950, U.S. Pat. No. 2,544,631 issued to Heimann on Mar. 6, 1951, U.S. Pat. No. 2,861,824 issued to Wurzel on Nov. 25, 1958, and German Pat. No. 767,134. Such rings are formed of spring material so that they can be compressed for insertion into an internal groove, or expanded for insertion into an external groove, of the machine, whereupon the ring springs-back into contact with the groove. The ring projects beyond the groove and forms an artificial stop shoulder to axially retain the particular assembly component.

In an effort to minimize axial looseness or end-play of the assembly component, split retaining rings have been heretofore provided with a beveled side surface portion which engages a correspondingly inclined wall of the groove. Accordingly, the spring action of the ring within the groove results in the ring being wedged in an axial direction to press the assembly component against another component or shoulder of the machine and thereby eliminate end-play.

One problem which has resulted from the use of beveled rings relates to the possibility of the ring being inserted backwards such that the beveled surface engages the retained machine component rather than the inclined groove wall. A backwardly mounted beveled ring is unable to restrain appreciable axial loads and is too easily dislodged from the groove when acted upon by the retained component.

One previously proposed solution to the problem of backwardly mounted rings involves the provision of bevels on both sides of the ring so that either orientation of the ring within the groove is proper. While overcoming the misassembly problem, such a double-bevel ring has exhibited little resistance to axial thrust loads and tends to be dislodged from the groove much more easily than a single bevel ring. Accordingly, double-bevel rings have not been commercially successful.

It is, therefore, an object of the present invention to minimize or obviate problems of the type previously discussed.

It is another object of the invention to provide a novel split retaining ring of the double-bevel type.

It is a further object of the invention to provide a novel double-bevel retaining ring which can take-up end play and yet exhibits a high resistance to axial thrust loads.

SUMMARY OF THE INVENTION

These objects are achieved by the present invention involving a spring retaining ring of the type adapted for assembly within a groove provided therefor in a housing bore or on a shaft (e.g., an axle) to form an artificial shoulder for axially locating a machine part. The spring comprises an open-ended ring body of spring material. The body includes opposite side surfaces, each surface including a generally radial shoulder-forming portion and a groove-seating portion which is inclined at an acute angle relative to the shoulder-forming portion. Either of the groove-seating surface portions are adapted to engage a correspondingly inclined wall of the groove to take-up axial play of the machine part. The length of each groove-seating surface portion is in the range of from 80% to 120% of the minimum groove penetration depth for the ring.

THE DRAWING

These and other objects and advantages of the invention will become apparent from the detailed description of a preferred embodiment thereof in connection with the accompanying drawings in which like numerals designate like elements, and in which:

FIG. 1 is a front view of a prior art retaining ring of the type having a tapered cross-section;

FIG. 2 is a fragmentary longitudinal sectional view of the ring of FIG. 1 seated within a groove in an assembly;

FIG. 3 is a view similar to FIG. 2 depicting the ring in a backward orientation;

FIG. 4 is a view similar to FIG. 2 of a prior art double-bevel ring;

FIGS. 10 to 14 are front views of different types of rings containing a double-bevel according to the present invention.

DETAILED DESCRIPTION OF PREFERRED EMBODIMENTS OF THE INVENTION

Figure 5:
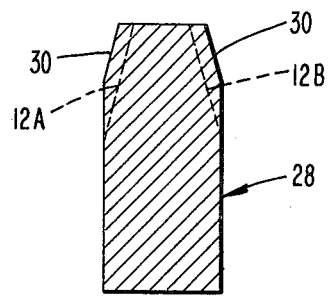
FIGS. 5 and 6 are cross-sectional views through different portions of a tapered cross-section, double-bevel ring according to the present invention, with prior art bevel surfaces being indicated by phantom lines.

FIGS. 1 and 2 depict a conventional type of split retaining ring 10 which has a varying or tapering cross-section, and a bevel 12 on one side of an outer, groove-seating edge of the ring. During use, the ring 10 is installed within an annular groove 13 of an assembly 14 to retain a component 16 of the assembly. The bevel surface 12 engages an inclined wall 18 of the groove whereby the ring 10 is wedged in an axial direction 19 to press the component 16 firmly against a wall 20 of the assembly. In this manner, axial looseness or end play of the component is eliminated.

Generally, the bevel 12 is inclined at a 10 to 20 degree angle from the non-inclined radial portion 15 of the same side of the ring. Angles much larger than that do not provide a secure seating of the ring, while smaller angles do not provide ample end play take-up.

For each split retaining ring there exists a minimum desirable depth of groove penetration by the ring in order to assure that a secure seating of the ring in the groove is established. For a ring of tapered cross-section, for example, as depicted in FIGS. 1-2, such minimum penetration depth M is one-half of the groove depth D measured along the inclined wall 18. For other types of rings such minimum penetration depth may differ, as by being one-third, one-fourth, etc., of the groove depth D. Of course, due to its spring characteristics, the ring 10, following initial insertion, attempts to penetrate the groove yet more deeply until either all axial play is taken-up, or the ring bottoms-out against the base 17 of the groove. Thus, the standard practice in the art has been to dimension the length of the bevel surface 12 greater than the length of the inclined wall 18 so that the bevel surface protrudes slightly beyond the groove even when the ring has bottomed-out, thereby assuring full contact of the wall 18 by the surface 12. Stated another way, the length of the bevel portion is over one-hundred percent greater than the minimum groove penetration depth D/2. That is, the distance between points 25 and 24 in FIG. 2 is more than the distance between points 24 and M, the latter representing the minimum groove penetration depth for that particular ring. (For rings whose minimum penetration depth is D/3 the beveled portion is over two-hundred percent longer than the minimum penetration depth, and over three-hundred percent longer for rings whose minimum penetration depth is D/4.)

In FIG. 3, there is depicted a situation in which a single-bevel ring 10 is accidentally inserted in a backwards manner within the groove 13. In such a case the ring barely penetrates the groove and is thus highly unstable and easily dislodged in response to forces applied by the retained component 16 in the axial direction 22.

In FIG. 4 there is depicted a split retaining ring 10A containing a double level 12A, 12B in the manner heretofore proposed in the art. Such bevels are designed in accordance with previously followed principles in the art, viz., the length of each bevel surface being over 100 percent longer than the minimum groove penetration depth. In practice, however, it has been found that such a double bevel ring 10A exhibits surprisingly low load-carrying capacity and is easily dislodged in a direction indicated by the broken-line position of the ring 10A in FIG. 4. That is, the previously proposed double-bevel rings are adapted to be easily swung about a pivot 24 defined by the outer edge of the inclined wall 18 of the groove 13, in response to urgings from the retained component 16. In a single-bevel ring as depicted in FIG. 2, such swinging movement is resisted by the non-beveled portion 26 of the ring located within the groove and immediately adjacent the component 16 which contacts the ring.

The absence of such a ring portion in the previously proposed double-bevel rings, however, renders the rings unstable. In addition, the absence of such a ring portion results in an increase in distance G between point 24 and the resultant F of the axial dislodging force applied by the retained component 16. That is, in the single-bevel ring of FIG. 2, the distance G', which constitutes the moment arm for the ring-dislodging force F' is shorter, resulting in less of a moment than in the double-bevel ring of FIG. 4.

As a result, the use of double-bevel rings has not been practicable, resulting in a continuance of the problem involving backwards insertion of the rings (FIG. 3).

In accordance with the present invention, a double-bevel ring is provided which is secure when installed within the groove and exhibits ample load-carrying capacity. The invention is based upon the discovery that such characteristics are achieved by a retaining ring having a double-bevel, with each bevel surface having a length which does not exceed the minimum groove penetration depth by more than twenty percent of the latter, or is no shorter than the minimum groove penetration depth by more than twenty percent of the latter.

Figure 6:
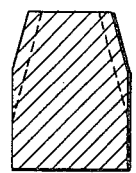

In FIGS. 5 and 6, two cross-sectional views are depicted through different locations of a tapered section height retaining ring 28 having a double-bevel 30 according to the present invention. Depicted in broken lines, for comparison purposes, are the previously proposed double-bevels 12A, 12B. The prior art bevel surfaces are dimensioned to be over one-hundred percent longer than the minimum penetration depth, whereas the bevel surfaces according to the present invention are dimensioned so that any variance with the minimum penetration depth lies within the range ±20%, i.e., the length of each groove seating surface on the ring is from 80% to 120% of the minimum penetration depth.

In keeping with the principles of the present invention, some particular examples of the double-bevel will now be described.

Figure 7:
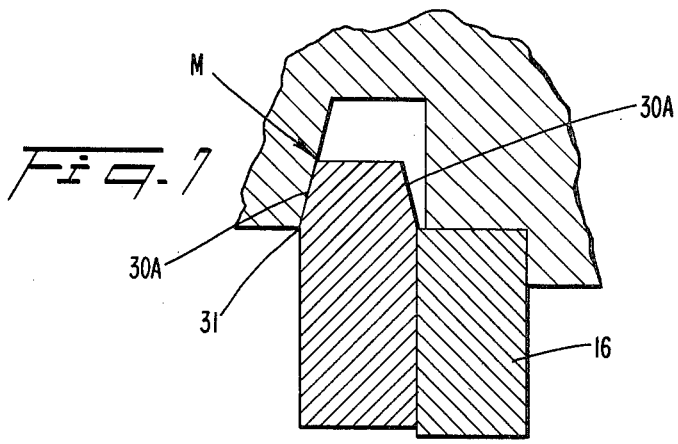
FIG. 7 is a fragmentary cross-sectional view of one form of double-bevel according to the present invention disposed within a groove.

In FIG. 7 an embodiment of the present invention is depicted wherein the length of the bevel surface 30A is equal to the minimum groove penetration, which is the distance from point 31 to point M.

Figure 8:
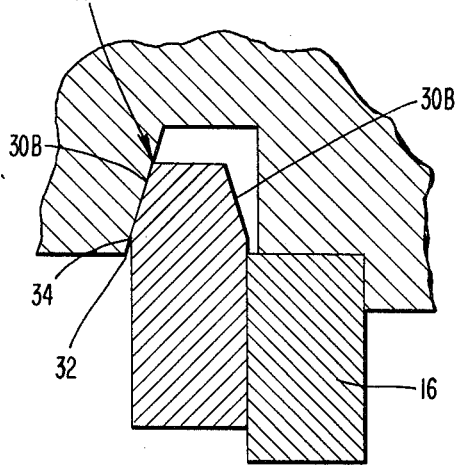
FIG. 8 is a view similar to FIG. 7 of another form of double-bevel according to the present invention.

In FIG. 8 an embodiment of the present invention is shown wherein the length of the bevel surface 30B is shorter than the minimum penetration depth by 20 percent of the latter. That is, the distance between points 32 and 34 in FIG. 8 is twenty percent of the distance between points 32 and M.

Figure 9:
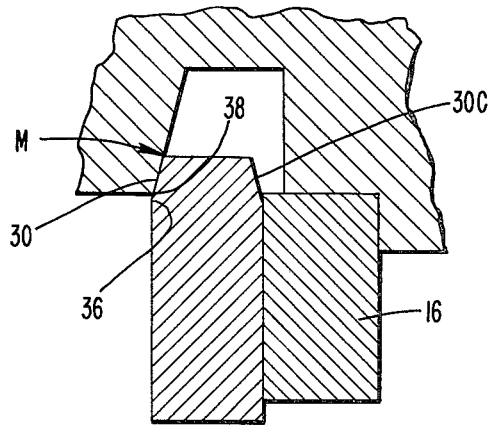
FIG. 9 is a view similar to FIG. 7 of still another form of double-bevel according to the present invention.

In FIG. 9 there is illustrated an embodiment of the invention wherein the length of the bevel surface 30C exceeds the minimum penetration depth by 20 percent of the latter. That is, the distance between points 36 and 38 is twenty percent of the distance between points 38 and M.

During tests of rings configured in accordance with FIGS. 7-9, it was found that the rings remain adequately secure within the groove and exhibit sufficient load-carrying capacity to resist loads exerted by the retained component 16.

The double-bevel concept according to the present invention can be employed in connection with any kind of split retaining rings such as both internal and external types of such rings. Examples are shown in FIGS. 10 to 14. In FIGS. 10 and 11 retaining rings 40, 42 are depicted which are of the uniform cross-section type. The ring 40 is provided with a double-bevel 40A at the outer edge, whereas the ring 42 is provided with a double-bevel 42A at an inner edge.

In FIGS. 12 and 13 retaining rings 44, 46 of the multi-truss type are depicted. Rings of that type are described for example in U.S. Pat. No. 4,006,659 issued to Wurzel et al on Feb. 8, 1977. The ring 44 contains a double-bevel 44A at an inner edge thereof, whereas the ring 46 contains a double-bevel at an outer edge 46A thereof.

In FIG. 14 a retaining ring 48 of the variable cross-section type is depicted. That ring contains a double-bevel 48A at an inner edge thereof.

As a result of the present invention, problems involving backwardly inserted rings have been eliminated by a ring which exhibits ample load-bearing capacity.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A spring retaining ring of the type adapted for assembly within a groove in a housing bore or shaft or the like, thereupon to form an artificial shoulder for axially locating a machine part, said ring comprising an open-ended ring body of spring material, said body including opposite side surfaces, each surface including a generally radial shoulder-forming portion and a groove-seating portion which is inclined at an acute angle relative to said shoulder-forming portion, either of said groove-seating portions being adapted to engage a correspondingly inclined wall of the groove to take-up axial play of the machine part, the length of each groove-seating surface portion being from 80% to 120% of the minimum groove penetration depth for said ring.

2. A retaining ring according to claim 1, wherein said inclined groove-seating surface portions of said ring are located at a radially inner edge of said ring.

3. A retaining ring according to claim 1, wherein said inclined groove-seating surface portions of said ring are located at a radially outer edge of said ring.

4. A spring retaining ring in combination with an assembly having a part to be retained, and an annular groove disposed adjacent said part, said groove including an inclined wall, said ring being of the type adapted for assembly within the groove to form an artificial shoulder for axially locating the assembly part, said spring comprising an open-ended ring body of spring material, said body including opposite side surfaces, each surface including a generally radial shoulder-forming portion and a groove-seating portion which is inclined at an acute angle relative to said shoulder-forming portion and complementarily to the inclination of said inclined wall of said groove, either of said groove-seating surface portions being adapted to engage said inclined wall of the groove for axial play take-up, the length of each groove-seating surface portion being from 80% to 120% of the minimum groove penetration depth for said ring.

5. A retaining ring according to claim 4, wherein said inclined groove-seating surface portions of said ring are located at a radially inner edge of said ring.

6. A retaining ring according to claim 4, wherein said inclined groove-seating surface portions of said ring are located at a radially outer edge of said ring.

* * * * *